US012703789B2

(12) United States Patent
Chen et al.

(10) Patent No.: US 12,703,789 B2
(45) Date of Patent: Aug. 11, 2026

(54) MOLDED ARTICLE WITH METALLIC APPEARANCE

(71) Applicant: The Procter & Gamble Company, Cincinnati, OH (US)

(72) Inventors: Fang Chen, Beijing (CN); Fangyu Cheng, Beijing (CN); Wenlong Pang, Beijing (CN); Zhan Cheng, Beijing (CN); Ruizhi Pei, Beijing (CN); Zihui Xu, Beijing (CN); Ping Wang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 781 days.

(21) Appl. No.: 17/709,631

(22) Filed: Mar. 31, 2022

(65) Prior Publication Data

US 2022/0348749 A1 Nov. 3, 2022

(30) Foreign Application Priority Data

Apr. 30, 2021 (WO) ................ PCT/CN2021/091246

(51) Int. Cl.

| | |
|---|---|
| ***C08L 23/12*** | (2006.01) |
| ***B29C 48/00*** | (2019.01) |
| ***B29C 48/03*** | (2019.01) |
| ***B29C 49/00*** | (2006.01) |
| ***B29C 49/04*** | (2006.01) |
| ***B29C 49/06*** | (2006.01) |
| ***B29C 49/08*** | (2006.01) |
| ***B29K 23/00*** | (2006.01) |
| ***B29K 103/06*** | (2006.01) |
| ***B29K 105/16*** | (2006.01) |
| ***B29K 505/00*** | (2006.01) |
| ***B29K 509/10*** | (2006.01) |
| ***B29L 31/00*** | (2006.01) |
| ***C08J 3/20*** | (2006.01) |
| ***C08K 3/08*** | (2006.01) |
| ***C08K 3/34*** | (2006.01) |
| ***C08K 7/00*** | (2006.01) |
| ***C08K 9/02*** | (2006.01) |
| ***C08L 23/10*** | (2006.01) |

(52) U.S. Cl.

CPC .......... *C08L 23/12* (2013.01); *B29C 49/0005* (2013.01); *C08J 3/201* (2013.01); *C08K 7/00* (2013.01); *C08K 9/02* (2013.01); *C08L 23/10* (2013.01); *B29C 48/022* (2019.02); *B29C 48/03* (2019.02); *B29C 49/04* (2013.01); *B29C 49/06* (2013.01); *B29C 49/08* (2013.01); *B29C 2949/0715* (2022.05); *B29C 2949/3032* (2022.05); *B29C 2949/3041* (2022.05); *B29K 2023/065* (2013.01); *B29K 2023/12* (2013.01); *B29K 2103/06* (2013.01); *B29K 2105/16* (2013.01); *B29K 2505/00* (2013.01); *B29K 2509/10* (2013.01); *B29L 2031/7158* (2013.01); *C08J 2323/10* (2013.01); *C08J 2323/12* (2013.01); *C08J 2423/06* (2013.01); *C08J 2423/08* (2013.01); *C08K 3/08* (2013.01); *C08K 3/346* (2013.01); *C08L 2205/025* (2013.01); *C08L 2207/062* (2013.01); *C08L 2207/066* (2013.01)

(58) Field of Classification Search

CPC .... C08L 23/12; C08L 23/10; C08L 2205/025; C08L 2207/066; C08L 2207/062; C08J 3/201; C08J 2323/12; C08J 2423/06; C08J 2323/10; C08J 2423/08; C08K 9/02; C08K 7/00; C08K 3/346; C08K 3/08; B29C 49/0005; B29C 49/04; B29C 49/06; B29C 48/022; B29C 48/03; B29C 49/08; B29C 2949/0715; B29C 2949/3032; B29C 2949/3041; B29L 2031/7158; B29K 2023/12; B29K 2105/16; B29K 2509/10; B29K 2505/00; B29K 2023/065; B29K 2103/06

See application file for complete search history.

(56) References Cited

U.S. PATENT DOCUMENTS

| | | | | |
|---|---|---|---|---|
| 4,221,882 | A * | 9/1980 | Huff ........................ | C08L 23/12 525/197 |
| 5,766,334 | A | 6/1998 | Hashizume et al. | |
| 8,691,138 | B2 | 4/2014 | Kang | |
| 2006/0013977 | A1* | 1/2006 | Duke ........................ | F41H 5/04 428/218 |
| 2007/0045893 | A1* | 3/2007 | Asthana .................. | B32B 27/20 156/244.11 |
| 2008/0210463 | A1 | 9/2008 | Maas et al. | |
| 2012/0165422 | A1 | 6/2012 | Vernon et al. | |
| 2013/0150480 | A1 | 6/2013 | Kim et al. | |

(Continued)

FOREIGN PATENT DOCUMENTS

| | | |
|---|---|---|
| CN | 102134341 A | 7/2011 |
| CN | 102134357 A | 7/2011 |

(Continued)

OTHER PUBLICATIONS

PCT Search Report and Written Opinion for PCT/CN2021/091246 dated Feb. 10, 2022, 8 pages.

(Continued)

*Primary Examiner* — Patrick D Niland
(74) *Attorney, Agent, or Firm* — Kathleen Y. Carter; Mimi Y. Yang

(57) ABSTRACT

The present invention relates to a molded article with a sufficiently metallic appearance and a sufficient degree of brightness.

15 Claims, 1 Drawing Sheet

(56) References Cited

U.S. PATENT DOCUMENTS

| | | | |
|---|---|---|---|
| 2014/0221547 | A1 | 8/2014 | Kim |
| 2017/0283563 | A1 | 10/2017 | Overend |
| 2018/0223087 | A1 | 8/2018 | Bernhardt et al. |
| 2021/0130571 | A1 | 5/2021 | Wang et al. |

FOREIGN PATENT DOCUMENTS

| | | | | |
|---|---|---|---|---|
| CN | 102134366 | A | 7/2011 | |
| CN | 102134367 | A | 7/2011 | |
| CN | 102372904 | A | 3/2012 | |
| CN | 103910941 | B | 8/2016 | |
| CN | 105968683 | A | 9/2016 | |
| CN | 106117803 | A | 11/2016 | |
| CN | 104479427 | B | 1/2017 | |
| CN | 103881284 | B | 7/2017 | |
| CN | 105037880 | B | 4/2018 | |
| CN | 107868342 | A | 4/2018 | |
| CN | 105733318 | B | 5/2018 | |
| CN | 108712962 | A | 10/2018 | |
| EP | 2842993 | A1 | 3/2015 | |
| JP | S6463114 | A | 3/1989 | |
| JP | 2002256151 | A | 9/2002 | |
| JP | 3994245 | B2 | 8/2007 | |
| JP | 2009120789 | A | 6/2009 | |
| JP | 2012072363 | A | 4/2012 | |
| JP | 2012188571 | A | 10/2012 | |
| JP | 2013108010 | A | 6/2013 | |
| JP | 5338644 | B2 | 8/2013 | |
| JP | 2014065792 | A | 4/2014 | |
| WO | WO-2004044048 | A2 * | 5/2004 | ............. C08L 23/10 |
| WO | 2007039323 | A1 | 4/2007 | |
| WO | 2009045692 | A1 | 4/2009 | |
| WO | WO-2018041925 | A1 * | 3/2018 | ............ C08K 3/041 |
| WO | 2021082865 | A1 | 5/2021 | |

OTHER PUBLICATIONS

All Office Actions; U.S. Appl. No. 17/074,709, filed Oct. 20, 2020.

* cited by examiner

MOLDED ARTICLE WITH METALLIC APPEARANCE

FIELD OF THE INVENTION

The present invention relates to a molded article with both a sufficiently metallic appearance and a sufficient degree of brightness, as well as a process for making the same.

BACKGROUND OF THE INVENTION

Articles made of thermoplastic materials have been widely used in consumer goods, such as packages for hair care products (for example shampoo), beauty care products (for example cosmetics), fabric care products (for example, liquid detergent), food and household products. Metallic appearance (or also called "metallic effect") is perceived as a premium appearance by consumers. It is getting more and more popular for molded plastic articles. To achieve the metallic appearance, a conventional manufacturing process is to employ a post-molding decoration process, such as vacuum metallization, sputtering, spraying or painting, to form a metallic coating over the molded plastic articles. However, those post-molding decoration processes can cause a series of problems including environmental pollution, safety hazards, inconsistent quality, no recyclability, and poor durability. Particularly, the defect rate of products treated by those post-mold decoration processes is high. Also, the coating material may peel off in the presence of some chemicals or due to the rotation of hinges for those products with hinges. Furthermore, the scratching resistance may not be good enough for transportation and handling. The cost is another disadvantage because such processes are quite expensive.

Recently, an alternative technique has been developed for providing a metallic appearance. Particularly, metal particles may be added as a pigment or masterbatch into the thermoplastic material before molding, so that the metal particles are distributed throughout the molded article formed by the thermoplastic material, resulting in a metallic effect. On one hand, if there are too few metal particles in the molded article, the article does not appear sufficiently "metallic" to convey the sense of premiumness to consumers. On the other hand, the molded article may have an improved metallic appearance with more metal particles added thereinto, but the article may start to take on a darker tone that is unappealing to the consumers. This tension point is particularly evident in extrusion blow molded (EMB) articles, which in general have a less smooth surface that tends to appear even darker due to the light diffusion and absorption by the surface, in comparison as compared with injection stretch blow molded (ISBM) articles.

There is therefore a need for providing a molded article, especially an extrusion blow molded (EBM) article, that is characterized by both a sufficiently metallic appearance and a sufficient degree of brightness, which are aesthetically pleasing and appealing to the consumers.

SUMMARY OF THE INVENTION

Surprisingly, the present inventors found that a molded article exhibits an unexpectedly improved degree of brightness as well as a sufficiently metallic appearance, when metallic flakes are added into the thermoplastic materials together with solid particles that are both reflective and translucent (e.g., mica, glass fiber, SiO2, Al2O3, and the like) at specific weight ratios. The present invention relates to a molded article having at least one part that comprises at least one layer comprising: a) from 50% to 99.98% of a thermoplastic material by weight of said layer; b) from 0.01% to 40% of metallic flakes by weight of said layer; and c) from 0.01% to 40% of solid particles by weight of said layer, wherein said solid particles are characterized by a Specular Reflection Ratio of from 0.4 to 0.8 and a Light Transmittance of from 40% to 95%, and wherein the weight ratio of said solid particles to said metallic flakes ranges from 0.1 to 50.

The present invention also relates to a process for making a molded article, comprising the steps of:

a) mixing a molten thermoplastic material, metallic flakes, and solid particles to form a blend, wherein the blend comprises from 50% to 99.98% by weight of said molten thermoplastic material, from 0.01% to 40% by weight of said metallic flakes, and from 0.01% to 40% by weight of said solid particles; wherein said solid particles are characterized by a Specular Reflection Ratio of from 0.4 to 0.8 and a Light Transmittance of from 40% to 95%; and wherein the weight ratio of said solid particles to said metallic flakes ranges from 0.1 to 50;

b) extruding or injecting said blend, either alone or together with one or more other blends, to form a parison or a preform; and c) blowing said parison or preform inside a mold to form a molded article, wherein said molded article has at least one part that comprises at least one layer that is formed by said blend.

These and other features of the present invention will become apparent to one skilled in the art upon review of the following detailed description when taken in conjunction with the appended claims.

DETAILED DESCRIPTION OF THE INVENTION

Definitions

Figure 1A:
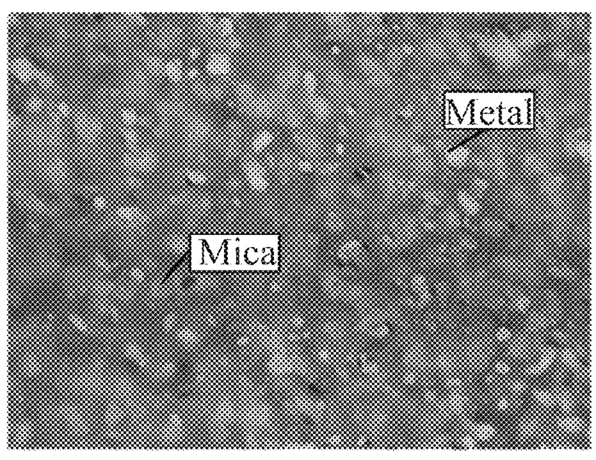
FIG. 1A is a microscopic view of the metallic flakes and mica flakes used by the present invention under a light reflection mode.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

"Article", as used herein refers to an individual molded object, such as a bottle, a tube, a tottle, a handle, a pipe, and the like. Preferably the article is a container, non-limiting examples of which include a bottle, a tottle, a jar, a cup, a cap, and the like. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. The container may be used to store, transport, or dispense compositions contained therein. Non-limiting volumes containable within the container are from 10 ml, 100 ml, 500 ml or 1000 ml to 1500 ml, 2000 ml or 4000 ml.

"Layer" as used herein means a macro-scale layer of the material forming an article. Typically, the macro-scale layer has a thickness of from about 0.01 mm, 0.1 mm, 0.2 mm, 0.3 mm, 0.4 mm, or 0.5 mm to about 1 mm, 1.5 mm, 2 mm, 2.5 mm, 3 mm, 3.5 mm, 4 mm, 5 mm, 10 mm, 20 mm or 30 mm "By weight of one layer" refers to the percentage of the ingredient by weight of the layer where it is present, rather than by weight of the whole article (unless, of course, the whole article is formed of a single layer).

As used herein, the term "flake" or "flakes" refers to particles having an aspect ratio of at least 2, preferably at least 5, more preferably at least 10, and most preferably at least 20.

As used herein, the term "aspect ratio" refers to the ratio of the average maximum diameter over the average thickness of an object.

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

Article

It has surprisingly been found by the inventors of the present invention that the molded article according to the present disclosure can have both a sufficiently metallic appearance and an improved degree of brightness, when metallic flakes and solid particles with specific Specular Reflection Ratio and Light Transmittance (i.e., the solid flakes are both reflective and translucent) are added together into the thermoplastic materials at specific weight ratios.

Particularly, according to one aspect of the present invention, there is provided a molded article having at least one part that comprises at least one layer comprising: a) from 50% to 99.98% of a thermoplastic material by weight of said layer; b) from 0.01% to 40% of metallic flakes by weight of said layer; and c) from 0.01% to 40% of solid particles by weight of said layer, wherein said solid flakes are characterized by a Specular Reflection Ratio of from 0.4 to 0.8 and a light transmittance of from 40% to 95%, and wherein the weight ratio of said solid particles to said metallic flakes ranges from 0.1 to 50.

Without being bound by any theory, it is believed that such reflective and translucent solid particles can better direct/guide light reflected by metallic flakes to provide an improved degree of brightness (measured by the L45 and/or L110 values, preferably the L110 values), while without significantly sacrificing the metallic appearance of the article (measured by the Flop Index). The weight ratio of such solid particles to the metallic flakes is important for achieving a desired balance between the metallic appearance and the brightness. For example, if the weight ratio is below 0.1, then there are too many metallic flakes in the molded article, which may lead to a high metallic but dark appearance. However, if the weight ratio is above 50, then there are too few metallic flakes in the molded article, which leads to a high degree of brightness but a pasty (rather than metallic) look.

Preferably, the weight ratio of said solid particles to said metallic flakes as contained in said at least one layer ranges from 0.5 to 40, preferably from 1 to 30, more preferably from 2 to 15. For example, said at least one layer may comprise from 0.1% to 25%, preferably from 0.2% to 15%, more preferably from 0.5 to 10%, by weight of said solid particles. Said at least one layer may comprise from 0.02% to 15%, preferably from 0.1% to 10%, more preferably from 0.2% to 2%, most preferably from 0.5% to 1%, by weight of said metallic flakes.

Said at least one layer may comprise from 70% to 99.9%, preferably from 90% to 99.8%, more preferably from 95% to 99.6%, by weight of said thermoplastic material.

The term "article" refers to items, packaging or containers formed by a molding process. Such packaging or containers may be suitable for containing different compositions, including, but not limited to detergents (e.g., laundry care, dish care, skin and hair care), beverages, powders, paper (e.g., tissues, wipes), beauty care compositions (e.g., cosmetics, lotions), medicinal or oral care products (e.g., toothpaste, mouth wash), etc. The compositions may be liquid, semi-liquid, solid, semi-solid, gel, emulsion, aerosol, foam, gaseous, or a combination thereof. The article may be used to store, transport, or dispense compositions contained therein, such as tubes, handles, pipes, and the like. Other molded articles may include e.g., a bottle, a cap, a pump, a box, a jar, and a cup. The article may be formed from an intermediate form that may be further processed, for example a parison or a preform. Particularly, the article may be formed from a parison for EBM (i.e., a parison is molded by extrusion molding process and then cooled and put through the blow molding process) or a preform for ISBM (i.e., a preform is molded by injection molding process and then cooled and put through the stretch blow molding process).

The article according to the present disclosure may comprise at least one layer, for example, one layer, two layers, or three layers. In some embodiments, the layer may be not laminated. The at least one layer as described hereinabove is preferably an exterior layer, or an intermediate layer covered by a transparent exterior layer, if the molded article comprises more than one layers.

The individual layer of the article may have a thickness of from about 0.1 mm to about 50 mm, preferably from about 0.3 mm to about 30 mm, more preferably from about 0.5 mm to about 20 mm, most preferably from about 0.6 mm to about 10 mm, for example 0.7 mm, 0.8 mm, 0.9 mm, 1.0 mm, 3.0 mm, 5.0 mm, 7.0 mm, 9.0 mm or any ranges therebetween.

The article according to the present disclosure has a sufficiently metallic appearance, preferably but not necessarily characterized by a Flop Index of from 5 to 30, preferably from 6 to 25, more preferably from 7 to 20, more preferably from 8 to 15, most preferably from 10 to 14. The article of the present disclosure also has an improved brightness (in comparison with a similar article that contains only the metal flakes but not the solid flakes), preferably but not necessary characterized by a L110 Value of from 30 to 70, preferably from 35 to 65, more preferably from 40 to 60. Because the Flop Index and L110 Value satisfactory to consumer perception may vary widely depending on the color of the article, those parameters should be considered more for their comparative values in demonstrating superiority of one article over the other, rather than for their absolute values.

The article according to the present disclosure may be an extrusion blow molded (EBM) article, an injection molded (IM) article, an injection blow molded (IBM) article, or an injection stretch blow molded (ISBM) article. Preferably, the article is an EBM article where the challenges of dark appearance is particularly acute. However, similar technical benefit of improved brightness can also be observed in IM, IBM or ISBM articles.

Thermoplastic Materials

The thermoplastic resin suitable for the practice of the present invention may be selected from the group consisting of said thermoplastic material comprises polypropylene (PP) including chlorinated polypropylene (CPP); polyethylene (PE) including high density polyethylene (HDPE), ultra-high molecular weight polyethylene (UHMWPE), medium density polyethylene (MDPE), low density polyethylene (LDPE), linear low density polyethylene (LLDPE), chlorinated polyethylene (CPE), and the like; ethylene-propylene copolymer, polymethylpentene (PMP), cyclic olefin copolymer (COC), polyvinylchloride (PVC), chlorinated polyvinylchloride (CPVC), polyvinyl dichloride (PVDC), polystyrene (PS), acrylonitrile styrene (AS), acrylonitrile butadiene styrene (ABS), polyacrylonitrile (PAN), styrene butadiene copolymer (SBC), polymethyl Methacrylate (PMMA), polyamide (PA), polyethylene terephthalate (PET), glycol modified polyethylene terephthalate (PETG), polycyclohexylenedimethylene terephthalate (PCT), glycol-modified PCT copolymer (PCTG), copolyester of cyclohexanedimethanol and terephthalic acid (PCTA), polybutylene terephthalate (PBT), polyethylene naphthalate (PEN), polycarbonate (PC), polypropylene carbonate (PPC), poly-L-glutamic acid (PGA), cellulosic plastics, polylactide (PLA), polybutylene adipate-co-terephthalate (PBAT), Polybutylene succinate (PBS), polybutylene succinate adipate (PBSA), Polycaprolactone (PCL), thermoplastic starch (TPS), polyvinyl alcohol (PVA), chitosan, polyhydroxyalkanoates (PHA) and copolymers thereof, ethylene methacrylic acid copolymer with zinc (Zn), sodium (Na), lithium (Li) or other metal ions, thermoplastic elastomers (TPE) including but not limited to styrene-butadiene-styrene block copolymer (SBS), Styrene-Isoprene-Styrene copolymer (SIS), styrene-ethylene-butylene-styrene block copolymer (SEBS), Styrene-Ethylene-Propylene-Styrene copolymer (SEPS), Thermoplastic olefin (TPO), Thermoplastic Vulcanizate (TPV), Thermoplastic polybutadiene (TPB), Thermoplastic polyisoprene (TPI), Thermoplastic polyvinylchloride (TPVC), Thermoplastic chlorinated polyethene (TCPE), Thermoplastic polyurethane elastomer (TPU), Thermoplastic polyester elastomer (TPEE), Thermoplastic polyamide elastomer (TPAE), Thermoplastic Fluoride (TPF), Thermoplastic silicone vulcanizate (TPSiV), copolymers thereof, or any combinations thereof.

In some embodiments, the article according to the present invention may comprise polyethylene terephthalate (PET), polyethylene terephthalate glycol (PETG), polystyrene (PS), polycarbonate (PC), polypropylene carbonate (PPC), poly-L-glutamic acid (PGA), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof.

In some embodiments, the article according to the present invention may comprise polyethylene terephthalate (PET), polystyrene (PS), polycarbonate (PC), polyvinylchloride (PVC), polyethylene (PE), polypropylene (PP), or any combinations thereof, preferably PP, PE (e.g., HDPE, LDPE, LLDPE), PS or any combinations thereof, more preferably PP, PE or any combination thereof.

The above-mentioned thermoplastic materials used for making the molded article of the present invention may be virgin materials, or they can be recycled materials or a combination/blend of both virgin and recycled materials.

Solid Particles

Figure 1B:
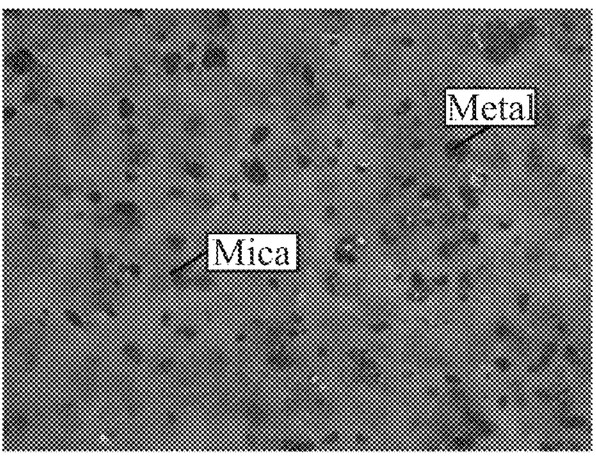
FIG. 1B is a microscopic view of the metallic flakes and mica flakes used by the present invention under a light transmission mode.

The solid particles as used in the present invention are both reflective and translucent, which are characterized by: (1) a Specular Reflection Ratio of from 0.4 to 0.8, preferably from 0.5 to 0.7, for example, 0.5, 0.55, 0.6, 0.65, or any ranges therebetween; and (2) a Light Transmittance of from 40% to 95%, preferably from 50% to 90%, for example, 55%, 60%, 65%, 70%, 75%, 80%, 85%, or any ranges therebetween. It is important that the solid particles used in the present invention has the above-described Specular Reflection Ratio and Light Transmittance, in order to ensure that the resulting molded article has a sufficiently metallic appearance and an improved degree of brightness. In contrast, the metallic flakes are highly reflective but not translucent. As shown by FIGS. 1A and 1B, the white mica flakes as used in the examples of this disclosure are both reflective (although not as reflective as metallic flakes) under a light reflection mode and translucent under a light transmission mode.

The solid particles may comprise a material selected from the group consisting of mica, glass fiber, $SiO_2$, $Al_2O_3$, and the combinations thereof.

Said solid particles may have any shapes, e.g., sphere, cube, rectangular, oval, tubular, flat, etc. Preferably, said solid particles are flakes with an aspect ratio of at least 2, preferably from 2 to 1,000, more preferably from 3 to 200, still more preferably from 4 to 100, and most preferably from 5 to 50, for example, 6, 8, 10, 15, 20, 25, 30, 35, 40, 45, or any ranges therebetween.

Preferably, said solid particles are mica flakes. More preferably, said mica flakes comprise a material selected from the group consisting of $KAl_2[AlSi_3O_{10}][OH]_2$, $KMg_3[AlSi_3O_{10}][F,OH]_2$, and a combination thereof. The mica flakes may have one or more surface coating layers formed of metal oxide with either high or low refractive indexes. Such coating layer may comprise a material selected from the group consisting of $TiO_2$, $Fe_2O_3$, $ZrO_2$, $Al_2O_3$, $Cr_2O_3$, and any combinations thereof. The coating process is by a wet chemical procedure that controls the optical thickness of the desired coating. If coated, it is important to ensure that the coating layer(s) are not too thick to reduce the light transmittance value of the mica flakes to below 40%.

An example of mica flakes suitable for use in the present invention is a white mica comprising a base material of $KAl_2[AlSi_3O_{10}][OH]_2$ and a $TiO_2$ coating. Another example of mica flakes suitable for use in the present invention is a gold mica comprising a base material of $KMg_3[AlSi_3O_{10}][F,OH]_2$ without any coating. Other coated/uncoated mica flakes of gold or silver color can also be used.

The mica flakes can be characterized by an average maximum diameter of from 1 μm to 100 μm, preferably from 2 μm to 50 μm, more preferably from 3 μm to 40 μm, and most preferably from 5 μm to 30 μm, for example, 6 μm, 8 μm, 10 μm, 15 μm, 18 μm, 20 μm, 22 μm, 24 μm, 28 μm or any ranges therebetween. The mica flakes can also be characterized by an average thickness of from 0.01 μm to 20 μm, preferably from 0.05 μm to 10 μm, more preferably from 0.1 μm to 5 μm, and most preferably from 0.5 μm to 2 μm, for example, 0.6 μm, 0.8 μm, 1 μm, 1.2 μm, 1.4 μm, 1.6 μm, 1.8 μm, or any ranges therebetween. The mica flakes can further be characterized by an aspect ratio of from 2 to 1,000, preferably from 3 to 200, more preferably from 4 to 100, and most preferably from 5 to 50, for example, 6, 8, 10, 15, 20, 25, 30, 35, 40, 45, or any ranges therebetween.

Metallic Flakes

The metallic flakes of the present invention may comprise a metal and/or an oxide thereof, preferably aluminum and/or an oxide thereof, silver and/or an oxide thereof, copper and/or an oxide thereof, gold and/or an oxide thereof, palladium and/or an oxide thereof, chrome and/or an oxide thereof, or any combinations thereof, more preferably aluminum and/or an oxide thereof. Furthermore, the metallic flakes may comprise a core and an organic coating outside said core, in which said core may comprise a metal and/or an oxide thereof and said organic coating may comprise silicone, PE wax, PP wax, styrene-maleic anhydride copolymer, terpene resin, stearates, mineral oil, siloxanes or any combinations thereof. Preferably, the coating may comprise PE wax, PP wax, siloxanes or any combinations thereof.

In some embodiments, the metallic flakes may be combined with various colorant pigments, including yellow, gold, red, green, blue, and the like as well as some special effect masterbatch, including pearlescent, or other additives.

The metallic flakes of the present invention are preferably characterized by an average maximum diameter of from 1 μm to 100 μm, preferably from 3 μm to 50 μm, more preferably from 5 μm to 30 μm, and most preferably from 7 μm to 20 μm, for example 5 μm, 6 μm, 7 μm, 8 μm, 9 μm, 10 μm, 12 μm, 14 μm, 16 μm, 18 μm or any ranges therebetween. The metallic flakes can also be characterized by average thickness of from 0.01 μm to 10 μm, preferably from 0.05 μm to 1 μm, more preferably from 0.10 μm to 0.50 μm, and most preferably from 0.15 μm to 0.35 μm, for example 0.10 μm, 0.12 μm, 0.14 μm, 0.16 μm, 0.18 μm, 0.20 μm, 0.22 μm, 0.24 μm, 0.26 μm, 0.28 μm or any ranges therebetween. The metallic flakes can further be characterized by an aspect ratio ranging from 3 to 1,000, preferably from 5 to 500, more preferably from 10 to 200, and most preferably from 30 to 100, for example 10, 15, 18, 20, 25, 30, 35, 40, 45, 50, 55, 60, 65, 70, 80, 90 or any ranges therebetween.

Adjunct Agents

The article comprises from about 0.1%, 0.3%, 0.5% or 1% to about 5%, 10%, 15% or 20% by weight of the article or a layer of the article, of an adjunct agent. The amount of adjunct agent present in the article is relatively low to ensure structural integrity and to allow ease and efficiency of recycling.

A wide variety of adjunct agents are suitable for use herein. In one embodiment, the adjunct agent may be an internal lubricant and/or peroxide. Particularly, the layer further comprises from 0.1% to 5%, of an internal lubricant, preferably ethylene bis(stearamide) and/or peroxide, by weight of said layer. Without wishing to be bound by any theory, the addition of internal lubricant and/or peroxide would be helpful in forming the three-layered structure by reducing the viscosity of resin.

In other embodiments, some adjunct agents may be preferred due to other characteristics, including but not limited to: physical state under ambient temperature (namely, liquid or solid or gas), odour characteristic, commercial availability, cost, etc.

Preferably, the adjunct agent is selected from the group consisting of an alcohol, oil, siloxane fluid, water, and a combination thereof.

In one embodiment, the adjunct agent is an alcohol preferably selected from the group consisting of a diol, triol, and a combination thereof. More preferably, the alcohol is selected from the group consisting of ethylene glycol, propylene glycol, glycerol, butanediol, butanetriol, poly(propylene glycol), derivatives thereof, and a combination thereof. Most preferably, the adjunct agent is glycerol.

In another embodiment, the adjunct agent is an oil selected from the group consisting of a plant oil, an animal oil, a petroleum-derived oil, and a combination thereof. For example, the adjunct agent could be an animal oil selected from the group consisting of tallow, lard, and a combination thereof. Preferably the adjunct agent is a plant oil selected from sesame oil, soybean oil, peanut oil, olive oil, castor oil, cotton seed oil, palm oil, canola oil, safflower oil, sunflower oil, corn oil, tall oil, rice bran oil, derivative and combinations thereof.

In a further embodiment, the adjunct agent is a siloxane fluid and may be a linear or branched polymer or copolymer. For example, the siloxane fluid may be a diorganosiloxane having one or more pendant or terminal groups selected from a group consisting of hydroxyl, vinyl, amine, phenyl, ethyl and mixtures thereof. Other suitable siloxane fluids include polydimethylsiloxane homopolymers, copolymers consisting essentially of dimethylsiloxane units and methylphenylsiloxane units, copolymers consisting essentially of diphenylsiloxane units and methylphenylsiloxane units. Mixtures of two or more of such siloxane fluid polymers and copolymers may be used.

In an embodiment, the adjunct agent is siloxane fluid, preferably polydimethylsiloxane.

In some other embodiments, the article of the present invention may comprise colorants (e.g., pigments, dyes, or combinations thereof), titanium dioxide, pearlescent agent, filler, cure agent, anti-statics, UV stabilizer, anti-oxidant, anti-block agent, catalyst stabilizer, nucleating agent, or a combination thereof.

Preferred Articles with Different Colors

The molded articles of the present invention may have different colors, and the ingredients and preferred compositions of such colored molded articles may slightly defer.

For example, when said molded article has a pink color, it may be a multilayer article with an inner layer, an intermediate layer, and an exterior layer. Preferably, it comprises an exterior layer (or an intermediate layer covered by a transparent exterior layer) comprising:

a) PE, preferably HDPE;
b) colorants;
c) from 0.01% to 0.03% of aluminum flakes by weight of said exterior layer, wherein said aluminum flakes have an average maximum diameter of from 10 μm to 35 μm; and
d) from 0.5% to 2% of mica flakes by weight of said exterior layer, wherein said mica flakes comprises KAl2[AlSi3O10][OH]2 with a coating of TiO2.

When the molded article has an orange color, it may be a multilayer article with an inner layer, an intermediate layer, and an exterior layer. Preferably, it comprises an exterior layer (or an intermediate layer covered by a transparent exterior layer) comprising:

a) PE, preferably HDPE;
b) colorants;
c) from 0.01% to 0.03% of aluminum flakes by weight of said exterior layer, wherein said aluminum flakes have an average maximum diameter of from 10 μm to 35 μm; and
d) from 0.5% to 2% of mica flakes by weight of said exterior layer.

When the molded article has a blue color, it may be a multilayer article with an inner layer, an intermediate layer, and an exterior layer. Preferably, it comprises an exterior layer (or an intermediate layer covered by a transparent exterior layer) comprising:

a) PE, preferably HDPE;
b) colorants;
c) from 0.3% to 0.5% of aluminum flakes by weight of said layer, wherein said aluminum flakes have an average maximum diameter of from 10 μm to 35 μm; and
d) from 0.1% to 0.3% of mica flakes by weight of said layer, wherein said mica flakes comprises KAl2 [AlSi3O10][OH]2 with a coating of TiO2.

When the molded article has a silver color, it may consist of a single layer comprising:

a) PE, preferably HDPE;
c) from 0.2% to 0.4% of aluminum flakes by weight of said layer, wherein said aluminum flakes have an average maximum diameter of from 10 μm to 35 μm; and
d) from 0.5% to 0.7% of mica flakes by weight of said layer, wherein said mica flakes comprises KAl2 [AlSi3O10][OH]2 with a coating of TiO2.

Process of Making

One aspect of the present invention is directed to a process for making the article by either extrusion blow molding (EBM), injection molding (IM), injection blow molding (IBM), or injection stretch blow molding (ISBM). Preferably, the process for making the article of the present invention is an EBM process.

Preferably, the metallic flakes and the solid flakes as described hereinabove are first combined with a carrier (e.g., a thermoplastic material) to form a masterbatch. More preferably, the masterbatch is formed by: mixing the thermoplastic material and additive under ambient temperature; extruding the mixture of the thermoplastic material, the metallic flakes and the solid flakes in an extruder (e.g., a twin screw extruder) to form pellets; and then cooling the pellets in a water bath to form a blend, i.e., the masterbatch. The step of mixing the thermoplastic material the metallic flakes and the solid flakes is preferably operated under ambient temperature to minimize chemical bonding between the metallic and solid flakes and the thermoplastic material. Then, the masterbatch is further mixed with more of the same thermoplastic material to form the blow mold blend. The masterbatch may comprise certain adjunct ingredients (e.g., colorants). For example, the masterbatch is typically a color masterbatch used for providing color to a container.

Alternatively, the metallic flakes and the solid flakes are added into the thermoplastic material directly, i.e., without forming a masterbatch. The combination of the metallic flakes and the solid flakes with the thermoplastic material is preferably uniformly mixed to form the blow mold blend.

Next, blowing the blow mold blend can be conducted by any blow molding processes like EBM, IM, IBM, or ISBM. In an EBM process, the above blow mold blend is melted and extruded into a parison and is followed by a blow molding process. In an ISBM or IBM process, the above blow mold blend is melted and injected into a preform and is followed by a blow molding process or stretch blow molding process. The EBM process is preferred. In a multilayer execution, the container comprising multiple layers is made from multiple layer parisons or preforms depending on types of blow molding.

In a preferred EBM process, the extrusion temperature preferably ranges from 160° C. to 210° C. for HDPE (for example, 210° C., 190° C., 180° C., 170° C., 160° C. or any values therebetween) and from 150° C. to 180° C. for PP (for example, 180° C., 170° C., 160° C., 155° C., 150° C.), with an extrusion rate of about 20-40 rpm for HDPE and about 40-60 rpm for PP. The blow mold die temperature preferably ranges from 200° C. to 220° C. for HDPE and from 170° C. to 190° C. for PP. The mold temperature is around room temperature.

Test Method

Test 1: Specular Reflection Ratio

The Specular Reflection Ratio of sample solid particles is measured by weighing 0.01 g of the sample particles and dispersing such into 100 mL ethanol. The dispersion is extracted by using a syringe to dose 0.04 ml of such dispersion on a 75*25 mm glass slide. The glass slide with such dispersion is left in ambient air for about 5 mins for the ethanol to evaporate.

An Aluminum foil with an area of 25*25 mm and a roughness of 0.37 μm is used as the benchmark sample for the Specular Reflectance Ratio calculation. The Aluminum foil is transferred to an optical microscope (e.g., Olympus BX51) for image acquisition. The image acquisition settings include: top light mode; eyepiece X10; object lens X50; Exposure time: 1/150 s; Contrast level: normal; Sharpness: Normal.

The acquired image is saved in Tiff format in 8 bit with a resolution of 1360*1024 pixel.

The image acquired for the aluminum foil should have a proper exposure and contrast, where the average gray level is around 210~240. The Al Specular Reflectance gray level is measured by taking the mean gray level of a rectangle area of 10 μm*10 μm on the image. The average Al Specular Reflectance gray level is calculated by taking the average of 5 replicate areas.

The glass slide with the dried dispersion is transferred to the optical microscope following the same image acquisition settings as those used for the aluminum foil. The Specular Reflectance gray level of a sample solid particle is measured by taking the mean gray level of an area within the particle that covers at least 2/3 of the particle area.

The Specular Reflectance Ratio (SRR) of a particle is calculated as:

$$SRR = \text{Specular Reflectance gray level of particle} / \text{Average Al Specular Reflectance gray level}$$

The final Specular Reflectance Ratio of the sample solid particles is calculated by taking the average Specular Reflectance Ratio of five particles.

Test 2: Light Transmittance Measurement

The Light Transmittance of sample solid particles is measured by weighing 0.01 g of such sample solid particles and then dispersing it into 100 mL ethanol. The dispersion is extracted by using a syringe to dose 0.04 ml of such dispersion on a 75*25 mm glass slide. The glass slide with such dispersion is left in ambient air for about 5 mins for the ethanol to evaporate.

The glass slide is then transferred to an optical microscope (e.g., Olympus BX53) for image acquisition. The image acquisition settings include: backlight mode; eyepiece X10; object lens X40; Exposure time: 160 μs; Contrast level: 3; Bin: 1; Gain: 0.5.

The acquired image is saved in Tiff format in 8 bit with a resolution of 77.5 nm/pixel. The image acquired should have a proper exposure and contrast, where the background (area without particles) has a gray level of around 210~240. The background gray level is measured by taking the mean gray level of a rectangle area of 10 μm*10 μm in the background area on the image. The average background gray level is calculated by taking the average of 5 replicate background gray level.

The transmitted gray level of a sample solid particle is measured by taking the mean gray level of an area within the particle that covers at least ⅔ of the particle area.

The Light Transmittance of a sample solid particle is calculated as:

Light Transmittance=Transmitted gray level of particle/Average background gray level The final Light Transmittance of the sample solid particles is calculated by taking the average Light Transmittance of five particles.

Test 3: L15/L45/L110 and Flop Index Measurement

L15, L45, L110 and Flop Index (FI) values can be measured following ASTM E2539. Suitable measuring device include multi angle photometer MA98 from X-rite Company.

$L^*_{15°}$ or L15 describes the luminosity measured at the angle which is 15° to the normal line from the reflection direction, and $L^*_{110°}$ or L110 is the luminosity measured at the angle which is 110° to the normal line from the reflection direction. $L^*_{45°}$ or L45 is the luminosity measured at the normal line. Both L45 and L110 can be used to assess the whiteness or brightness on the diffuse reflect direction. In this disclosure, L110 is used primarily for assessing the brightness of the molded article.

Flop Index or "FI" is the characterization of color luminosity change, and it is a very important measure for metallic appearance. Particularly, FI indicates the lightness change at different scattering angles. It can be mathematically calculated by the following formula:

$$\text{Flop Index} = \frac{2.69(L^*_{15°} - L^*_{110°})^{1.11}}{(L^*_{45°})^{0.86}};$$

wherein an incident light that is 45° to the surface, and the mirror reflection direction is symmetrically on the other side of the normal line which is perpendicular to the surface. Flop Index indicates the L changes with different observation angles and higher FI means more dark and light contrast and thus more evident effect.

EXAMPLES

The Examples herein are meant to exemplify the present invention but are not used to limit or otherwise define the scope of the present invention.

Example 1: Improved Brightness (L110) of Molded Articles with Added Mica Flakes Two (2) molded articles including Inventive Article 1 and Comparative Article A are prepared by a conventional EBM process as shown in the following Table 1.

TABLE 1

| EBM process for PP Resin | |
|---|---|
| Extrusion Device | Labtech Two-layer extrusion bottle blowing |
| Extrusion Temperature | 180° C. |
| Extrusion Rate | 30 RPM |
| Blow Mold Temperature | 180° C. |
| Mold Temperature | 20~30° C. |
| Mold | BJIC small square bottle |

Inventive Article 1 is prepared with 83% of PP-RP 5052 resin (obtained from _Lyondellbasell, Polymirae Co., Ltd. Yeosu, Korea) and 17% of a masterbatch containing both aluminum flakes (obtained from Shinemax Advanced Materials Co. Ltd. Shenzhen, China) and mica flakes (obtained from Shanghai Jinzhu Color Co., Ltd. Shanghai, China) to result in a final 0.6% of metallic flakes and 3% of mica flakes (5×) by weight in the finished article. Comparative Article A is prepared with 98% of PP resin and 2% of a masterbatch containing only aluminum flakes to result in a final 0.6% of metallic flakes by weight in the finished article. Both Inventive Article 1 and Comparative Article A are single-layer articles. The finished compositions of Inventive Article 1 and Comparative Article A and their respective FI and L110 values (measured according to the methods described in Test 3) indicative of their respective metallic appearance and brightness are shown in the following Table 2.

TABLE 2

| Ingredients (wt %) | Comparative Article A (Metallic Flakes Only) | Inventive Article 1 (Metallic Flakes + 5X Mica Flakes) |
|---|---|---|
| PP resin | 98% | 83% |
| Aluminum flakes | 0.6% | 0.6% |
| White mica flakes | 0 | 3% |
| LLDPE | 1.4% | 13.4% |
| FI | 10.9 ± 0.2 | 10.7 ± 0.2 |
| L110 | 30.4 ± 0.3 | 36.9 ± 0.4 |

The above results indicate that surprisingly and unexpectedly, the molded article containing both metallic flakes and mica flakes according to the present invention (e.g., Inventive Article 1) maintains a sufficiently metallic appearance comparable with that of a molded article that contains only metallic flakes (e.g., Comparative Article A), but it exhibits a significantly improved brightness due to the addition of 5× mica flakes.

Example 2: Impact of Mica/Metal Contents and Weight Ratios on Metallic Appearance (FI) and Brightness (L11) of HDPE EBM Articles Nineteen (19) molded HDPE articles including Inventive Articles 2-13 (containing both aluminum flakes and mica flakes) and Comparative Articles B-F (containing only mica or only aluminum flakes) are prepared by a conventional EBM process as shown in the following Table 3.

TABLE 3

| EBM process for HDPE Resin | |
|---|---|
| Extrusion Device | Labtech Two-layer extrusion bottle blowing |
| Extrusion Temperature | 210° C. |
| Extrusion Rate | 30 RPM |
| Blow Mold Temperature | 210° C. |

TABLE 3-continued

| EBM process for HDPE Resin | |
|---|---|
| Mold Temperature | 20~30° C. |
| Mold | BJIC small square bottle |

These molded articles are all single-layer bottles prepared with 83% of HDPE 5502 resin (obtained from Chevron Phillips Chemical Company LP, US) and 17% of a masterbatch containing various amounts of aluminum F-09 flakes (obtained from Shinemax Advanced Materials Co. Ltd. Shenzhen, China) and/or mica flakes (obtained from Shanghai Jinzhu Color Co., Ltd. Shanghai, China). The final weight percentages of aluminum flakes and mica flakes and their respective weight ratios in the finished articles and their respective FI and L110 values (measured according to the methods described in Test 3) indicative of their respective metallic appearance and brightness are shown in the following Table 4.

TABLE 4

| HDPE Articles | Al Flakes (wt %) | Mica Flakes (wt %) | Mica/Al Ratio | FI | L110 |
|---|---|---|---|---|---|
| B | 0 | 0.9 | ∞ | 4.5 ± 0.1 | 65.2 ± 0.7 |
| C | 0.1 | 0 | 0 | 6.5 ± 0.1 | 41.8 ± 0.5 |
| 2 | 0.1 | 0.1 | 1 | 6.1 ± 0.5 | 44.3 ± 1.3 |
| 3 | 0.1 | 0.2 | 2 | 6.9 ± 0.2 | 43.9 ± 1.0 |
| D | 0.3 | 0 | 0 | 9.4 ± 0.1 | 33.7 ± 0.4 |
| 4 | 0.3 | 0.6 | 2 | 10.5 ± 0.2 | 35.2 ± 0.3 |
| E | 0.6 | 0 | 0 | 10.9 ± 0.2 | 30.4 ± 0.3 |
| 5 | 0.6 | 0.6 | 1 | 11.4 ± 0.2 | 32.9 ± 0.3 |
| 6 | 0.6 | 1.5 | 2.5 | 12.1 ± 0.4 | 33.2 ± 0.4 |
| 7 | 0.6 | 3 | 5 | 10.7 ± 0.2 | 36.9 ± 0.4 |
| 8 | 0.6 | 6 | 10 | 10.7 ± 0.1 | 42.2 ± 1.2 |
| 9 | 0.6 | 12 | 20 | 9.8 ± 0.2 | 46.7 ± 0.6 |
| 10 | 0.6 | 18 | 30 | 8.5 ± 0.4 | 50.4 ± 1.7 |
| F | 0.9 | 0 | 0 | 11.4 ± 0.2 | 29.1 ± 0.6 |
| 11 | 0.9 | 1.8 | 2 | 12.0 ± 0.2 | 32.1 ± 0.6 |
| G | 1.2 | 0 | 0 | 11.1 ± 0.1 | 29.0 ± 0.6 |
| 12 | 1.2 | 3 | 2.5 | 12.3 ± 0.2 | 32.4 ± 0.4 |
| H | 1.5 | 0 | 0 | 11.7 ± 0.1 | 29.1 ± 0.7 |
| 13 | 1.5 | 3.75 | 2.5 | 12.0 ± 0.2 | 33.5 ± 0.5 |

The above results indicate that surprisingly and unexpectedly, the inventive molded articles containing both metallic flakes and mica flakes according to the present invention (e.g., Inventive Articles 2-13) maintains a sufficiently metallic appearance comparable with (sometimes even better than) that of similar molded articles that contains only metallic flakes (e.g., Comparative Articles C-H), but the inventive molded articles all exhibit significantly improved brightness with the addition of mica flakes. However, the complete removal of metallic flakes results in a molded article with a low metallic appearance that is too white/pasty (e.g., Comparative Article B). When the mica/metal weight ratio is within certain ranges (e.g., 1-20 or 2-10), the balance between metallic appearance and brightness seems to be particularly optimal.

Example 3: Impact of Mica/Metal Contents and Weight Ratios on Metallic Appearance (FI) and Brightness (L11) of PP EBM Articles Seven (7) molded PP articles including Inventive Articles 14-19 (containing both aluminum flakes and mica flakes) and Comparative Article I (containing only aluminum flakes) are prepared by a conventional EBM process as shown in the previously described Table 1.

These molded articles are all single-layer bottles prepared with 8%~98% of PP-RP 5052 resin (obtained from _Lyondellbasell, Polymirae Co., Ltd. Yeosu, Korea) and various amounts of aluminum F-09 flakes (obtained from Shinemax Advanced Materials Co. Ltd. Shenzhen, China) and/or mica flakes (obtained from Shanghai Jinzhu Color Co., Ltd., Shanghai, China). The final weight percentages of aluminum flakes and mica flakes and their respective weight ratios in the finished articles and their respective FI and L110 values (measured according to the methods described in Test 6) indicative of their respective metallic appearance and brightness are shown in the following Table 5.

TABLE 5

| PP Articles | Al Flakes (wt %) | Mica Flakes (wt %) | Mica/Al Ratio | FI | L110 |
|---|---|---|---|---|---|
| I | 0.6 | 0 | 0 | 11.7 ± 0.1 | 30.9 ± 0.1 |
| 14 | 0.6 | 0.6 | 1 | 12.5 ± 0.1 | 32.6 ± 0.1 |
| 15 | 0.6 | 1.5 | 2.5 | 12.5 ± 0.1 | 34.6 ± 0.3 |
| 16 | 0.6 | 3 | 5 | 11.9 ± 0.4 | 37.8 ± 0.5 |
| 17 | 0.6 | 6 | 10 | 11.3 ± 0.2 | 43.5 ± 0.3 |
| 18 | 0.6 | 12 | 20 | 10.0 ± 0.1 | 50.0 ± 0.4 |
| 19 | 0.6 | 18 | 30 | 8.5 ± 0.3 | 54.5 ± 0.6 |

The above results indicate that surprisingly and unexpectedly, the inventive molded articles containing both metallic flakes and mica flakes according to the present invention (e.g., Inventive Articles 14-19) maintains a sufficiently metallic appearance comparable with (sometimes even better than) that of a similar molded article that contains only metallic flakes (e.g., Comparative Article I), but the inventive molded articles all exhibit significantly improved brightness with the addition of mica flakes. When the mica/metal weight ratio is within certain specific ranges (e.g., 2.5-10), the balance between metallic appearance and brightness seems to be particularly optimal.

Example 4: Improved Brightness (L110) of Colored Articles with Added Mica Flakes Four (4) molded HDPE articles of different colors, including Inventive Articles 20-21 (containing both metal flakes and mica flakes) and Comparative Articles J-K (containing only metal flakes), are prepared by a conventional EBM process as shown in the previous Table 3.

These molded articles are all single-layer bottles prepared with 96%~99% of HDPE 5502 resin (obtained from Chevron Phillips Chemical Company LP, US) and various amounts of aluminum F-09 flakes (obtained from Shinemax Advanced Materials Co. Ltd., Shenzhen, China), copper/zinc alloy flakes (Bronze Powder 5000) obtained from AVL Metal Powders nv, Belgium, Europe) and/or mica flakes (obtained from Shanghai Jinzhu Color Co., Ltd., Shanghai, China). Inventive Article 20 and Comparative Article J are both dark blue containing 3% dark blue pigments. Inventive Article 21 and Comparative Article K both have a copper tone due to the copper flakes contained therein. The final weight percentages of aluminum flakes, copper flakes and mica flakes and their respective weight ratios in the finished articles and their respective FI and L110 values (measured according to the methods described in Test 6) indicative of their respective metallic appearance and brightness are shown in the following Table 6.

TABLE 6

| PP Articles | Al Flakes (wt %) | Cu/Zn Flakes (wt %) | Mica Flakes (wt %) | Mica/Al Ratio | FI | L110 |
|---|---|---|---|---|---|---|
| J | 0.3 | — | 0 | 0 | 10.4 ± 0.2 | 15.9 ± 0.2 |
| 20 | 0.3 | — | 0.6 | 2 | 11.3 ± 0.4 | 16.8 ± 0.3 |
| K | — | 0.3 | 0 | 0 | 7.1 ± 0.3 | 31.8 ± 1.0 |
| 21 | — | 0.3 | 0.3 | 1 | 8.6 ± 0.2 | 33.8 ± 1.2 |

The above results indicate that despite the dark colors, inventive molded articles containing both metallic flakes and mica flakes according to the present invention (e.g., Inventive Articles 20-21) still exhibit improved brightness over similar molded articles that contain only metallic flakes (e.g., Comparative Articles J-K), while sustaining a highly metallic appearance that is comparable with (actually better than) that of the Comparative Articles J-K.

Example 5: Reduced *Metallica* Appearance (FI) of Molded Articles with Added TiO2 Flakes Two (2) molded articles L and M are prepared by a conventional EBM process as shown in the previously described Table 3.

These molded articles are all single-layer bottles prepared with 97~98% of HDPE 5502 resin (obtained from Chevron Phillips Chemical Company LP, US) and various amounts of aluminum F-09 flakes (obtained from Shinemax Advanced Materials Co. Ltd., Shenzhen, China) and/or TiO2 flakes (obtained from Shanghai Jinzhu Color Co., Ltd., Shanghai, China). The final weight percentages of aluminum flakes and TiO2 flakes and their respective weight ratios in the finished articles and their respective FI and L110 values (measured according to the methods described in Test 3) indicative of their respective metallic appearance and brightness are shown in the following Table 7.

TABLE 7

| HDPE Articles | Al Flakes (wt %) | TiO2 Flakes (wt %) | FI | L110 |
|---|---|---|---|---|
| L | 0.6 | 0 | 10.9 ± 0.2 | 30.4 ± 0.3 |
| M | 0.6 | 0.2 | 6.0 ± 0.3 | 44.5 ± 1.1 |

The above results indicate that the addition of TiO2 flakes (rather than mica flakes) into molded articles containing metallic flakes significantly reduces the metallic appearance, even though it does increase the brightness. The TiO2 flakes are neither reflective (with a light reflectance below 0.2) nor translucent (i.e., with a light transmittance of only 20% or below), and therefore cannot be used to practice the present invention.

Example 6: Exemplary Molded Articles with Different Laminate Structures

Following are various exemplary molded articles of different laminate structures according to the present invention. For the sake of simplicity, only the relevant contents of metal/mica flakes and their respective locations in the molded articles are provided herein:

TABLE 8

| Examples | Metal Flakes | Mica Flakes | Ratio of Mica/Metal | Layer Containing Metal/Mica |
|---|---|---|---|---|
| 10 | 0.3% | 0.6% | 2 | Single layer bottle |
| 11 | 0.36% | 0.2% | 0.5 | Outer layer of 3-layer bottle |
| 12 | 0.02% | 0.6% | 30 | Outer layer of 3-layer bottle |
| 13 | 0.02% | 0.8% | 40 | Outer layer of 3-layer bottle |

Example 7: Improved Brightness (L110) of Injection Molded Articles with Added Mica Flakes Two (2) molded articles including Inventive Article 14 and Comparative Article N are prepared by a conventional IM process as shown in the following Table 9.

TABLE 9

| IM process for PP Resin | |
|---|---|
| Device | Haitian SA600 - 130 |
| Temperature setting | 1$^{st}$ stage at 190° C., 2$^{nd}$ stage at 180° C., 3$^{rd}$ stage at 180° C., 4$^{th}$ stage at 170° C. |
| Injection pressure | 90 MPa |
| Screw speed | 30 G/S |
| Total cycle time | 60 s |
| Mold | ASTM D638-14 standard injection molding bar Type I |

Inventive Article 14 is prepared with 83% of PP-344RK resin (obtained from North Huajin Chemical industries group Cooperation, Panjin, China) and 17% of a masterbatch containing both aluminum flakes (obtained from Shinemax Advanced Materials Co. Ltd. Shenzhen) and mica flakes (obtained from Shanghai Jinzhu Color Co., Ltd. Shanghai, China) to result in a final 0.6% of metallic flakes and 3% of mica flakes (5×) by weight in the finished article. Comparative Article N is prepared with 98% of PP-344RK resin and 2% of a masterbatch containing only aluminum flakes to result in a final 2% of metallic flakes by weight in the finished article. Both Inventive Article 14 and Comparative Article N are single-layer articles. The finished compositions of Inventive Article 14 and Comparative Article N and their respective FI and L110 values (measured according to the methods described in Test 3) indicative of their respective metallic appearance and brightness are shown in the following Table 10.

TABLE 10

| Ingredients (wt %) | Comparative Article N (Metallic Flakes Only) | Inventive Article 14 (Metallic Flakes + 5X Mica Flakes) |
|---|---|---|
| PP-344RK resin | 98% | 83% |
| Aluminum flakes | 0.6% | 0.6% |
| White mica flakes | 0 | 3% |
| LLDPE | 1.4% | 13.4% |
| FI | 14.0 ± 0.2 | 15.4 ± 0.4 |
| L110 | 24.6 ± 0.3 | 33.8 ± 0.7 |

The above results indicate that similar benefits (i.e., highly metallic appearance and improved brightness) are also observed in IM article that contains both metallic flakes and mica flakes according to the present invention (e.g., Inventive Article 14), in comparison with IM article that contains only metallic flakes (e.g., Comparative Article N).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A molded article having at least one part that comprises at least one layer comprising:

a) from 50% to 99.98% of a thermoplastic material by weight of said layer;

b) from 0.01% to 40% of metallic flakes by weight of said layer; and c) from 0.01% to 40% of solid particles by weight of said layer, wherein said solid particles are characterized by a Specular Reflection Ratio of from 0.4 to 0.8 and a Light Transmittance of from 40% to 95%, and wherein the weight ratio of said solid particles to said metallic flakes ranges from 2 to 50.

2. The molded article of claim 1, wherein the weight ratio of said solid particles to said metallic flakes ranges from 2 to 15.

3. The molded article of claim 1, wherein said solid particles are characterized by a Specular Reflection Ratio of from 0.5 to 0.7 and a Light Transmittance of from 50% to 90%; wherein said solid particles comprise a material selected from the group consisting of mica, glass fiber, $SiO_2$, $Al_2O_3$, and the combinations thereof.

4. The molded article according to claim 1, wherein said at least one layer comprises from 0.1% to 25% by weight of mica flakes; and wherein said mica flakes are characterized by:

an average maximum diameter of from 1 μm to 100 μum, and/or an average thickness of from 0.01 μm to 20 μm, and/or an aspect ratio of from 2 to 1,000.

5. The molded article according to claim 1, wherein said metallic flakes comprise a metal; wherein said metal is selected from the group consisting of aluminum, copper, zinc, silver, gold, palladium, chrome, and any alloys or oxides thereof.

6. The molded article according to claim 5, wherein said metallic flakes further comprise an organic coating; wherein said organic coating is selected from silicone, polyethylene (PE) wax, polypropylene (PP) wax, styrene-maleic anhydride copolymer, terpene resin, stearates, mineral oil, siloxanes and any combinations thereof.

7. The molded article according to claim 1, wherein said at least one layer comprises from 0.02% to 15% by weight of metallic flakes; and wherein preferably-said metallic flakes are characterized by:

an average maximum diameter of from 1 μm to 100 μm, and/or an average thickness of from 0.01 μm to 10 μm, and/or an aspect ratio of from 2 to 1,000.

8. The molded article according to claim 1, wherein said at least one layer comprises from 70% to 99.9%-by weight of said thermoplastic material; and wherein said thermoplastic material is selected from the group consisting of polypropylene (PP), chlorinated polypropylene (CPP), polyethylene (PE), high density polyethylene (HDPE), ultra-high molecular weight polyethylene (UHMWPE), medium density polyethylene (MDPE), low density polyethylene (LDPE), linear low density polyethylene (LLDPE), chlorinated polyethylene (CPE), ethylene-propylene copolymer, polymethylpentene (PMP), cyclic olefin copolymer (COC), polyvinylchloride (PVC), chlorinated polyvinylchloride (CPVC), polyvinyl dichloride (PVDC), polystyrene (PS), acrylonitrile styrene (AS), acrylonitrile butadiene styrene (ABS), polyacrylonitrile (PAN), styrene butadiene copolymer (SBC), polymethyl Methacrylate (PMMA), polyamide (PA), polyethylene terephthalate (PET), glycol modified polyethylene terephthalate (PETG), polycyclohexylenedimethylene terephthalate (PCT), glycol-modified PCT copolymer (PCTG), copolyester of cyclohexanedimethanol and terephthalic acid (PCTA), polybutylene terephthalate (PBT), polyethylene naphthalate (PEN), polycarbonate (PC), polypropylene carbonate (PPC), poly-L-glutamic acid (PGA), cellulosic plastics, polylactide (PLA), polybutylene adipate-co-terephthalate (PBAT), polybutylene succinate (PBS), polybutylene succinate adipate (PBSA), polycaprolactone (PCL), thermoplastic starch (TPS), polyvinyl alcohol (PVA), chitosan, polyhydroxyalkanoates (PHA) and copolymers thereof, ethylene methacrylic acid copolymer comprising metal ions selected from the group consisting of zinc (Zn), sodium (Na), lithium (Li) and combinations thereof, thermoplastic elastomers (TPE), styrene-butadiene-styrene block copolymer (SBS), styrene-isoprene-styrene copolymer (SIS), styrene-ethylene-butylene-styrene block copolymer (SEBS), styrene-ethylene-propylene-styrene copolymer (SEPS), thermoplastic olefin (TPO), thermoplastic vulcanizate (TPV), thermoplastic polybutadiene (TPB), thermoplastic polyisoprene (TPI), thermoplastic polyvinylchloride (TPVC), thermoplastic chlorinated polyethene (TCPE), thermoplastic polyurethane elastomer (TPU), thermoplastic polyester elastomer (TPEE), thermoplastic polyamide elastomer (TPAE), thermoplastic Fluoride (TPF), thermoplastic silicone vulcanizate (TPSiV), and any combinations thereof.

9. The molded article according to claim 1, wherein said molded article has a pink color and comprises an exterior layer comprising:

a) HDPE;

b) colorants;

c) from 0.01% to 0.03% of aluminum flakes by weight of said exterior layer, wherein said aluminum flakes have an average maximum diameter of from 10 μm to 35 μm; and d) from 0.5% to 2% of mica flakes by weight of said exterior layer, wherein said mica flakes comprises $KAl_2[AlSi_3O_{10}][OH]_2$ with a coating of $TiO_2$.

10. The molded article according to claim 1, wherein said molded article has an orange color and comprises an exterior layer comprising:

a) HDPE;

b) colorants;

c) from 0.01% to 0.03% of aluminum flakes by weight of said exterior layer, wherein said aluminum flakes have an average maximum diameter of from 10 μm to 35 μm; and d) from 0.5% to 2% of mica flakes by weight of said exterior layer.

11. The molded article according to claim 1, wherein said molded article has a blue color and comprises an exterior layer comprising:

a) HDPE;

b) colorants;

c) from 0.3% to 0.5% of aluminum flakes by weight of said layer, wherein said aluminum flakes have an average maximum diameter of from 10 μm to 35 μm; and d) from 0.1% to 0.3% of mica flakes by weight of said layer, wherein said mica flakes comprises $KAl_2[AlSi_3O_{10}][OH]_2$ with a coating of $TiO_2$.

12. The molded article according to claim 1, wherein said molded article has a silver color and consists of a single layer comprising:

a) HDPE;

b) from 0.2% to 0.4% of aluminum flakes by weight of said layer, wherein said aluminum flakes have an average maximum diameter of from 10 μm to 35 μm; and c) from 0.5% to 0.7% of mica flakes by weight of said layer, wherein said mica flakes comprises $KAl_2[AlSi_3O_{10}][OH]_2$ with a coating of $TiO_2$.

13. The molded article according to claim 1, wherein said molded article is selected from the group consisting of an extrusion blow molded article, an injection molded article, an injection blow molded article, and an injection stretch blow molded article.

14. A process for making a molded article, comprising the steps of:

a) mixing a molten thermoplastic material, metallic flakes, and solid particles to form a blend, wherein the blend comprises from 50% to 99.98% by weight of said molten thermoplastic material, from 0.01% to 40% by weight of said metallic flakes, and from 0.01% to 40% by weight of said solid particles; wherein said solid particles are characterized by a Specular Reflection Ratio of from 0.4 to 0.8 and a Light Transmittance of from 40% to 90%; and wherein the weight ratio of said solid particles to said metallic flakes ranges from 2 to 50;

b) extruding or injecting said blend, either alone or together with one or more other blends, to form a parison or a preform; and c) blowing said parison or preform inside a mold to form a molded article, wherein said molded article has at least one part that comprises at least one layer that is formed by said blend.

15. The molded article of claim 1, wherein said solid particles are solid flakes comprising mica flakes; wherein said mica flakes comprise a material selected from the group consisting of $KAl_2[AlSi_3O_{10}][OH]_2$, $KMg_3[AlSi_3O_{10}][F, OH]_2$, and a combination thereof; and wherein said mica flakes further comprise a coating selected from $TiO_2$, $Fe_2O_3$, $ZrO_2$, $Al_2O_3$, $Cr_2O_3$, and combinations thereof.

* * * * *